C. B. MANSBACH.
COMPOSITE HEEL.
APPLICATION FILED JUNE 4, 1917.
1,241,643. Patented Oct. 2, 1917.
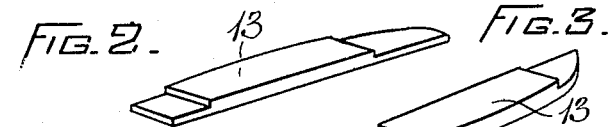
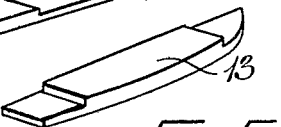
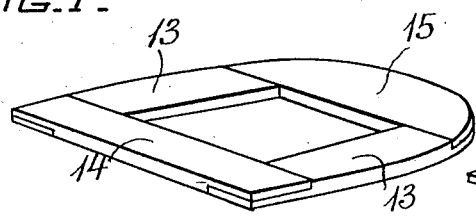
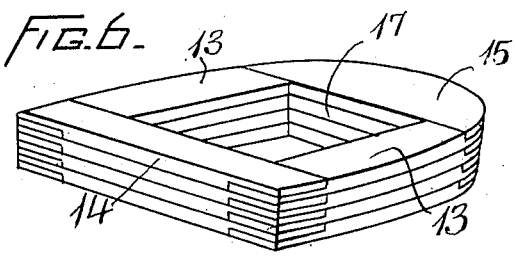
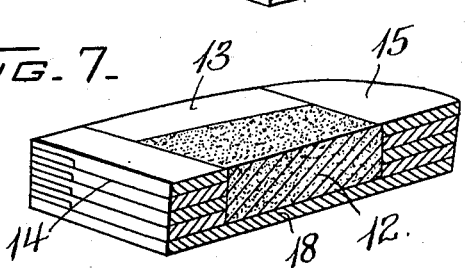
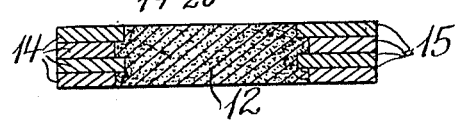
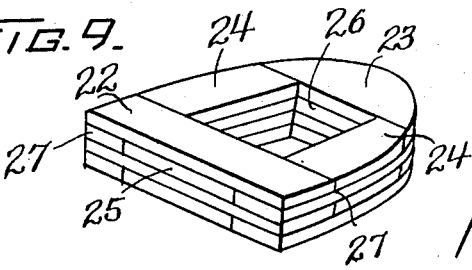
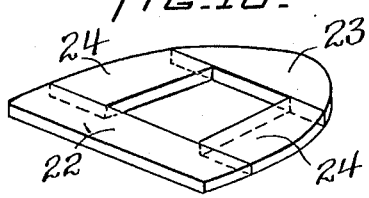
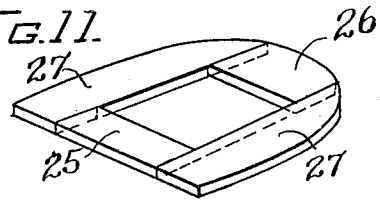
INVENTOR
C. B. Mansbach
by Knight Brown Quinby Mey
ATTY'S.

UNITED STATES PATENT OFFICE.

CONRAD B. MANSBACH, OF BROCKTON, MASSACHUSETTS, ASSIGNOR OF ONE-HALF TO FRANK L. PRICE, OF BROCKTON, MASSACHUSETTS.

COMPOSITE HEEL.

1,241,643.　　　Specification of Letters Patent.　　Patented Oct. 2, 1917.

Application filed June 4, 1917. Serial No. 172,598.

*To all whom it may concern:*

Be it known that I, CONRAD B. MANSBACH, a citizen of the United States, residing at Brockton, in the county of Plymouth and State of Massachusetts, have invented new and useful Improvements in Composite Heels, of which the following is a specification.

This invention relates to a heel or heel body composed of an internal portion or core, made from a relatively cheap leather substitute which may be a mixture adapted to be molded in a plastic condition and to solidify by drying, and an external portion composed of lifts formed to surround and confine said central portion and to receive attaching nails, each lift being composed of a plurality of relatively narrow members which may be waste pieces of sole leather.

The object of the invention is to provide a composite heel, the exposed surfaces of the sides, rear and breast of which are continuous and composed entirely of the material of the lifts, and are adapted to be finished by the usual operations, including the application of wax and polishing friction, to produce burnished surfaces of uniform color, either with or without the employment of coloring matter, said surfaces, if desired, presenting the natural color of the leather of which the lift members are made, or a color closely approximating thereto, as in so-called "russet" heels.

The invention consists in the improvements which I will now proceed to describe and claim.

Of the accompanying drawings forming a part of this specification,—

Figure 1 is a perspective view of one of the lifts of my improved heel.

Figs. 2, 3, 4 and 5 are perspective views of the members of said lift.

Fig. 6 is a perspective view, showing a plurality of lifts assembled to form the external portion of the heel body.

Fig. 7 is a perspective sectional view, showing the lifts and the internal portion or core assembled, and showing also a continuous top lift.

Fig. 8 is a sectional view of the heel body, showing the external and internal portions thereof interlocked.

Figs. 9, 10 and 11 are perspective views illustrating a modification.

The same reference characters indicate the same parts in all of the figures.

In the drawings, 12 represents an internal portion or core, made from a relatively cheap leather substitute, which may be a mixture including comminuted leather, and a suitable binder, the mixture being originally plastic and adapted to be molded, and also adapted to solidify by drying.

The external portion of the heel body is composed of a plurality of frame-shaped lifts, each preferably constructed as shown by Figs. 1 to 5, inclusive, in which 13, 14 and 15 designate the members of the frame-shaped lift. Said members are made of relatively narrow waste pieces or remnants of sole leather, or other like material, adapted to be finished by the usual burnishing operations, each lift having edge portions of substantially uniform thickness, so that when the lifts are assembled, as shown by Fig. 6, their outer edges collectively form the exposed continuous side, rear and breast surfaces of the heel body, said surfaces being composed entirely of the material of the lift members, and being practically solid or free from crevices through which the plastic material may exude to the exposed surfaces. Each lift member has end portions, which are reduced in thickness, and a relatively thick intermediate portion, said portions being so formed that when the members are assembled the reduced portions are in overlapping contact with each other, the outer edges of the lifts being closely abutted together, as indicated by Fig. 6.

The inner edges of the frame-shaped lifts form the walls of an opening 17, in which the internal portion 12 is confined.

The frame-shaped lifts may be assembled, as indicated by Fig. 6, and secured together by paste, a suitable bed being provided, which may be a continuous top lift 18, as shown by Fig. 7. The plastic material of the internal portion 12 may then be deposited in the opening or mold thus formed, the internal portion closely conforming to the mold surfaces.

If desired, the walls of the opening 17 may be provided with alternating projections 19 and recesses 20 with which the internal portion 12 is interlocked, as shown by Fig. 8, said projections and recesses being formed, if desired, by making the lift members of different widths.

The exposed side, rear and breast surfaces of the external portion formed wholly of the material of the lift members, when burnished, are of uniform color and texture, the material of the internal portion 12 being entirely excluded from said surfaces, so that it does not affect either the color or the texture thereof. My invention is therefore well adapted to produce so-called "russet" heels, although it is obvious that the exposed surfaces may be finished in black, or other colors, if desired.

The heel above described is distinguished from the heel disclosed by Patent 1,220,660, dated March 27, 1917, by the fact that the material of the internal portion 12 is entirely excluded from the side, rear and breast surfaces of the heel body, said surfaces being practically continuous or free from openings into which portions of the core may project.

As shown by Figs. 9, 10 and 11, the lifts of the heel body may be made of members which are not reduced in thickness and overlapped at their end portions, the body being composed of lifts formed as shown by Fig. 10, alternating with lifts formed as shown by Fig. 11. The lift shown by Fig. 10 is composed of a front piece 22, a rear piece 23, and two side pieces 24. The lift shown by Fig. 11 is composed of a front piece 25, a rear piece 26, and two side pieces 27. Each piece is of uniform thickness from end to end and is abutted against two companion pieces.

I claim:

1. A heel comprising an internal portion or core, made from a leather substitute, and an external portion including a plurality of superimposed pieced frame-shaped lifts surrounding the core and having outer edge portions closely abutted together to form exposed continuous rear, side and breast surfaces, composed entirely of the material of the lifts, and adapted to be uniformly finished.

2. A heel comprising a plurality of frame-shaped lifts, composed of relatively narrow members, forming frame-shaped lifts having outer edge portions closely abutted together to form exposed continuous rear, side and breast surfaces, composed entirely of the material of the lifts, the inner edges of the lifts forming walls of an opening surrounded by the lifts, and an internal portion made from a leather substitute molded in plastic form in said opening, and excluded by the lifts from said exposed surfaces.

3. A heel as specified by claim 2, the walls of said opening being provided with alternating projections and recesses interlocked with said internal portion.

In testimony whereof I have affixed my signature.

CONRAD B. MANSBACH.

Copies of this patent may be obtained for five cents each, by addressing the "Commissioner of Patents, Washington, D. C."